(12) United States Patent
Dolgin

(10) Patent No.: US 9,831,925 B2
(45) Date of Patent: Nov. 28, 2017

(54) HIGH EFFICIENCY POLARIZED ULF/VLF/RF TRANSCIEVER ANTENNA

(71) Applicant: Raytheon Company, Waltham, MA (US)

(72) Inventor: Benjamin P. Dolgin, Alexandria, VA (US)

(73) Assignee: Raytheon Company, Waltham, MA (US)

( * ) Notice: Subject to any disclaimer, the term of this patent is extended or adjusted under 35 U.S.C. 154(b) by 93 days.

(21) Appl. No.: 14/598,751

(22) Filed: Jan. 16, 2015

(65) Prior Publication Data
US 2015/0207232 A1    Jul. 23, 2015

Related U.S. Application Data

(60) Provisional application No. 61/929,248, filed on Jan. 20, 2014.

(51) Int. Cl.
*H01Q 7/08*        (2006.01)
*H04B 5/00*        (2006.01)
(Continued)

(52) U.S. Cl.
CPC .............. *H04B 5/0093* (2013.01); *H01Q 3/34* (2013.01); *H01Q 7/06* (2013.01); *H01Q 7/08* (2013.01);
(Continued)

(58) Field of Classification Search
CPC .. H04B 5/0081; H04B 5/0087; H04B 5/0093; H01Q 1/38; H01Q 7/06
See application file for complete search history.

(56) References Cited

U.S. PATENT DOCUMENTS 2,375,593 A * 5/1945 Sontheimer .............. H01Q 7/06
336/181
3,332,082 A 7/1967 Hatch
(Continued)

FOREIGN PATENT DOCUMENTS

WO        2009135040        11/2009

OTHER PUBLICATIONS

International Search Report and Written Opinion for corresponding International Application No. PCT/US2015/011786, dated Apr. 15, 2015.

*Primary Examiner* — Kristal Feggins
*Assistant Examiner* — Kendrick Liu
(74) *Attorney, Agent, or Firm* — Renner, Otto, Boisselle & Sklar, LLP

(57) ABSTRACT

A transmission antenna includes a closed-loop core having at least two electrically-conductive windings arranged on the closed-loop core. The windings are each electrically-actuated to generate a magnetic flux along the closed-loop core in opposing directions. The transmission antenna may generate a polarized magnetic field within a plane of the closed-loop core and provide broadband transmission of a polarized signal having a relatively flat frequency response. The transmission antenna is electrically-small, and the frequency of the polarized signal is nearly independent of the size of the closed-loop core. Multiple polarized signals may be provided, each being independently and continuously controlled through actuation of the windings. The direction of the polarized signal may also be varied. Additional windings for receiving a signal may simultaneously be employed on the closed-loop core. A method for transmitting a polarized signal with the transmission antenna is also provided.

17 Claims, 5 Drawing Sheets

(51) Int. Cl.
*H01Q 7/06* (2006.01)
*H04B 1/04* (2006.01)
*H01Q 3/34* (2006.01)
*H01Q 21/24* (2006.01)

(52) U.S. Cl.
CPC ......... *H01Q 21/245* (2013.01); *H04B 1/0475* (2013.01); *H04B 5/0081* (2013.01); *H04B 5/0087* (2013.01)

(56) References Cited

U.S. PATENT DOCUMENTS

| | | |
|---|---|---|
| 4,622,558 A | 11/1986 | Corum |
| 5,495,259 A * | 2/1996 | Lyasko ................. H01Q 21/29 343/787 |
| 6,028,558 A | 2/2000 | Van Voorhies |
| 6,204,821 B1 | 3/2001 | Van Voorhies |
| 6,239,760 B1 | 5/2001 | Van Voorhies |
| 6,300,920 B1 * | 10/2001 | Pertl ....................... H01Q 7/00 343/742 |
| 2005/0189945 A1 * | 9/2005 | Reiderman .............. G01V 3/28 324/333 |
| 2009/0160725 A1 | 6/2009 | Rhodes et al. |
| 2009/0295663 A1 * | 12/2009 | Sato .................... H01Q 1/3241 343/788 |
| 2009/0322640 A1 * | 12/2009 | LeVan ..................... H01Q 7/00 343/788 |
| 2010/0185041 A1 | 7/2010 | Lee |
| 2013/0249561 A1 | 9/2013 | Knizhnik |

* cited by examiner

HIGH EFFICIENCY POLARIZED ULF/VLF/RF TRANSCIEVER ANTENNA

RELATED APPLICATIONS

This application claims the benefit of U.S. Provisional Application No. 61/929,248 filed Jan. 20, 2014, which is hereby incorporated herein by reference in its entirety.

FIELD OF INVENTION

The present invention relates generally to transmission antennas, and more particularly to high-efficiency polarized ULF/VLF/RF transceiver antennas having a closed-loop core.

BACKGROUND

Transceiver antennas for transmitting a signal with a wavelength significantly larger than the wavelength of radiation are inefficient and typically do not provide polarization discrimination. Ferrite rod arrays have been used at lower frequencies to increase the efficiencies of transceiver antennas. Cross-talk between individual ferrite rods usually limits the ability to control polarization and directionality of such arrays. The efficiency of the ferrite rod drops dramatically with a decrease of the length to diameter ratio of the ferrite rod and with the rod length to coil length ratio. Toroidal receivers have been used in the ultra-low frequency (ULF) and very-low frequency (VLF) domain, but have not been used as transmission antennas for broadband transmission of a polarized signal. Achieving multiple polarization transmission with a broad frequency range from the same small antenna, in which the transmission wavelength is much greater than the size of the antenna, has remained a difficulty in the art.

SUMMARY OF INVENTION

The present invention provides a transmission antenna having a closed-loop core and two electrically-conductive windings arranged on the closed-loop core. The windings are each capable of producing a magnetic flux along the closed-loop core in opposing directions for generating a magnetic field. The transmission antenna may generate a polarized signal having a relatively flat frequency response, and may provide broadband transmission of the polarized signal across a distance. The transmission antenna may be electrically-small and have a high-efficiency that is nearly independent of the transmission frequency. The magnetic field generated by the transmission antenna may be strongly polarized within the plane of the closed-loop core, and the polarized signal may be strongly polarized within the same plane. Multiple polarized signals may be provided by employing additional windings, which may be independently and continuously controlled. A phase-shifted electrical signal applied to the windings may vary the directionality of the transmitted polarized signal within the plane of the closed-loop core. The effective cross-talk between the respective windings may be minimal, and additional windings for receiving a signal may simultaneously be used on the closed-loop core. The polarization of the receiver antenna may be similarly controlled by a phase delay of constituent receiver windings. The strongly polarized signal generated by the transmission antenna may also be used for such applications as ground penetrating radar, misaligned-beam radar, and more.

According to an aspect of the invention, a transmission antenna is provided that includes a closed-loop core, a first electrically-conductive winding, and a second electrically-conductive winding. The first winding has an electrically-conductive wire transversely wound around a first segment of the closed-loop core, and is configured for generating a magnetic flux in a first direction along the closed-loop core when electrical current passes through the first winding. The second winding has an electrically-conductive wire transversely wound around a second segment of the closed-loop core, and is configured for generating a magnetic flux in a second direction along the closed loop core when electrical current passes through the second winding. The magnetic flux in the first direction is opposite the magnetic flux in the second direction for generating a polarized magnetic field and transmitting a polarized signal.

Embodiments of the invention may include one or more of the following additional features. That is, the first winding and the second winding may be arranged on the closed-loop core in magnetic symmetry, such that magnetic field leakage through the sides of the closed-loop core is reduced and polarization of the magnetic field within the plane of the closed-loop core is enhanced.

In another embodiment, the first winding and the second winding may be electrically connected in series. A further optional feature includes the first winding and the second winding being substantially similar for generating respective magnet fluxes that are substantially similar.

According to yet another embodiment of the invention, the respective windings may be configured to reduce electrical resistance and/or inductive impedance, such that electrical current flowing through the respective windings is increased for enabling an increase in the magnetic moment of the transmission antenna for enhancing the strength of the transmitted polarized signal. For example, inductive impedance may be reduced by reducing or limiting the number of turns in the winding; and resistance may be reduced by reducing or limiting the length of the electrically-conductive wire, increasing the cross-sectional area of the wire, and/or using a wire made from a low-resistivity material.

According to an embodiment, the first winding and the second winding may each have 50 turns or fewer of the electrically-conductive wire.

In another embodiment, the closed-loop core may be configured to increase magnetic flux density, such as by increasing the mass of the closed-loop core and/or providing a closed-loop core made from high-magnetic permeability material.

Still other embodiments of the invention include the transmission antenna further having a signal conditioner for sending a signal, wherein the signal conditioner is electrically coupled to the first winding and the second winding. The transmission antenna may further include an amplifier configured for amplifying a signal from the signal conditioner, wherein the amplifier is electrically interposed between the signal conditioner and the respective windings.

In another embodiment, the transmission antenna is a transceiver antenna further including a first receiver winding and a second receiver winding configured for receiving a signal. The first and second receiver windings may have a greater number of turns than the first and/or second windings used for transmission, such as 1,000 or more turns.

In yet another embodiment, the transmission antenna may further include a third winding and a fourth winding, which may be similar to the first winding and/or second winding used for transmission. The third winding and the fourth winding may each be configured for generating a magnetic flux in a direction along the closed-loop core when electrical current passes through the respective third and fourth windings. The respective magnetic fluxes of the third winding and the fourth winding may be in opposite directions along the closed-loop core for generating a polarized magnetic field. The third and fourth windings may be capable of simultaneously generating a polarized signal in a different direction from the polarized signal of the first and second windings. The multiple polarized signals may be independently and continuously controlled through electrical actuation of the respective windings.

In still another embodiment, the third and fourth windings may be configured for receiving an electrical signal that is phase-shifted from an electrical signal received by the first and second windings. The respective first, second, third and fourth windings may be configured for generating a polarized signal that is capable of changing direction in response to the phase-shifting between the electrical signals sent to each winding.

According to another aspect of the invention, a method for transmitting a signal from a transmission antenna is provided, including the steps: (i) generating an electrical signal with a signal conditioner; (ii) amplifying the electrical signal with an amplifier to produce an amplified electrical signal; (iii) applying the amplified electrical signal to a first winding having an electrically-conductive wire transversely wound around a first segment of a closed-loop core, and generating a magnetic flux with the first winding that is in a clockwise or counter-clockwise direction along the closed-loop core; (iv) applying the amplified electrical signal to a second winding having an electrically-conductive wire transversely wound around a second segment of the closed-loop core, and generating a magnetic flux with the second winding that is in an opposite direction to the magnetic flux of the first winding; (v) intersecting the magnetic fluxes from the first winding and the second winding to produce a polarized magnetic field; and (vi) generating a polarized signal that may correspond to the electrical signal, whereby the antenna transmits the polarized signal across a distance.

The following description and the annexed drawings set forth certain illustrative embodiments of the invention. These embodiments are indicative, however, of but a few of the various ways in which the principles of the invention may be employed. Other objects, advantages and novel features according to aspects of the invention will become apparent from the following detailed description when considered in conjunction with the drawings.

BRIEF DESCRIPTION OF THE DRAWINGS

The annexed drawings, which are not necessarily to scale, show various aspects of the invention.

DETAILED DESCRIPTION

A transmission antenna includes a closed-loop core having at least two electrically-conductive windings arranged on the closed-loop core. The windings each generate a magnetic field when electrically actuated, and the windings each produce a magnetic flux along the closed-loop core in opposing directions. The transmission antenna may generate a polarized magnetic field within a plane of the closed-loop core and provide broadband transmission of a polarized signal having a relatively flat frequency response. The transmission antenna is electrically small, and the frequency of the polarized signal is nearly independent of the size of the closed-loop core. Multiple polarized signals may be provided, each being independently and continuously controlled through actuation of the windings. The direction of the polarized signal may also be varied within the plane of the closed-loop core through phase-modulation of the signal applied to each winding. Additional windings for transmitting and receiving a signal may simultaneously be employed on the closed-loop core. The transmission antenna may be used in a variety of applications, such as a transceiver antenna for land, air, sea, or space-based communications; guidance communications; radar applications, and others. It will of course be appreciated, and also understood, that the principles of this invention may be applicable to other antennas where it is desirable to transmit information with a polarized signal from an electrically-small antenna.

Figure 1:
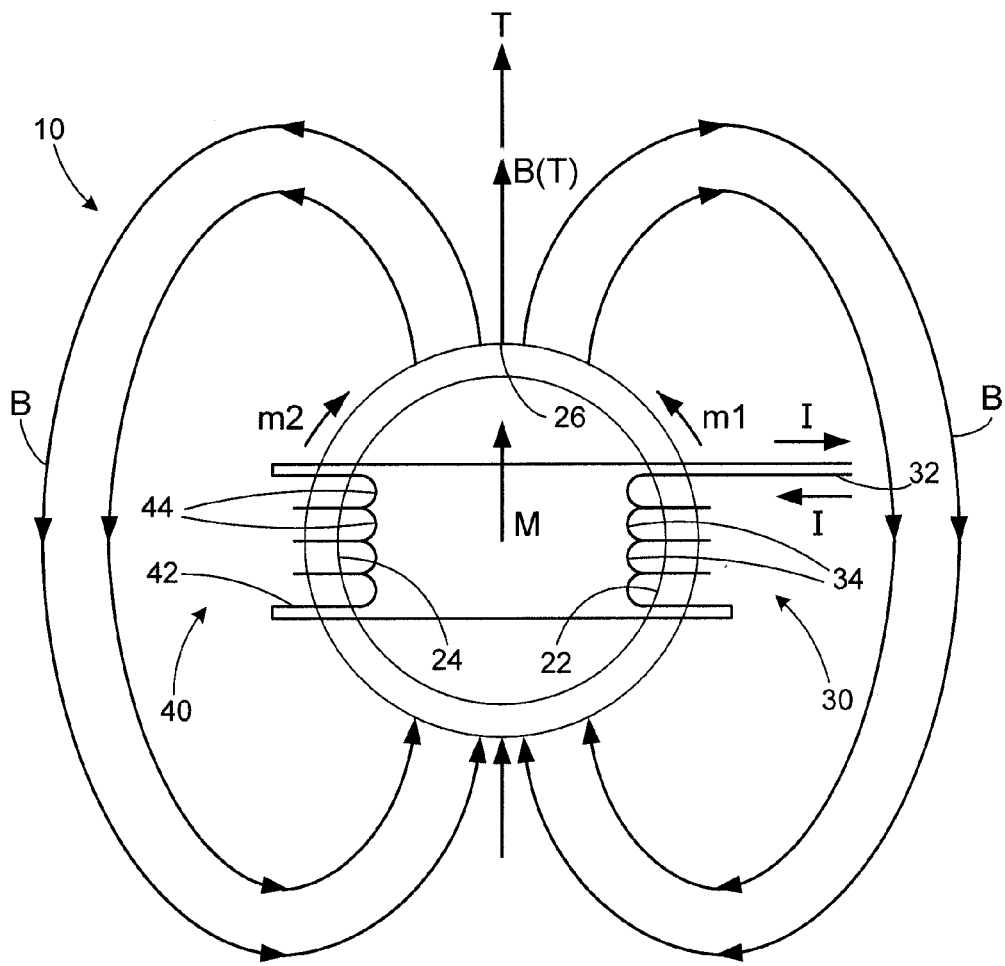
FIG. 1 is a top plan view of a transmission antenna according to the invention.
Figure 2:
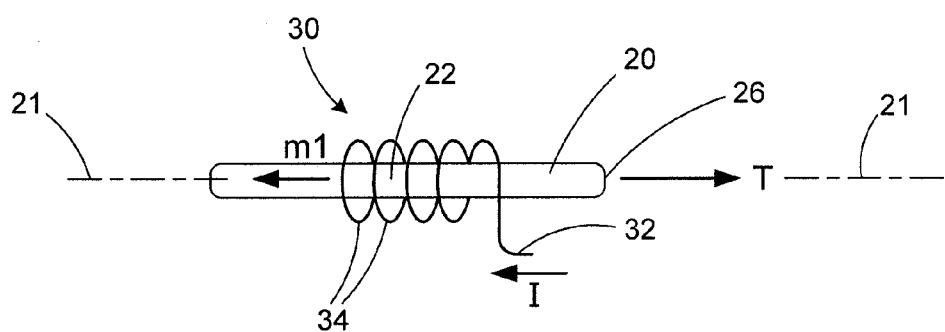
FIG. 2 is a side view of the transmission antenna of FIG. 1.

Turning to FIG. 1 and FIG. 2, an exemplary transmission antenna 10 is shown. The transmission antenna 10 includes a closed-loop core 20, a first electrically-conductive winding 30, and a second electrically-conductive winding 40. The first winding 30 is arranged on a first segment 22 of the closed-loop core 20, and the second winding 40 is arranged on a second segment 24 of the closed-loop core 20.

The first winding 30 includes an electrically-conductive wire 32 that is wound around the first segment 22 of the closed-loop core 20. The wire 32 may be transversely wound around the closed-loop core such that the wire 32 creates a number of loops or turns 34 that intersect a plane 21 in which the closed-loop core 20 is disposed. Each loop 34 of wire 32 is referred to as a turn 34, and the consecutive turns 34 may extend along the segment 22 forming a coil that has a central axis that is parallel to the plane 21 of the closed-loop core 20. The wire 32 may be wound around the closed-loop core 20 with no spacing between turns 34, in which case the wire 32 may be encased in insulation to prevent current from passing between the wire turns 34. The wire 32 may also be helically wound around the closed-loop core 20 with a uniform spacing between turns 34 (i.e., of the same pitch), or the wire 32 may be spirally wound around the closed-loop core 20 with an uneven spacing between turns 34. The wire 32 may be wound directly around the outer surface of the close-loop core 20, or the wire 32 may be wound around a spool made of plastic or other material to hold the winding 30 in place on the closed-loop core 20.

The second winding 40 also includes an electrically-conductive wire 42 that is transversely wound around the second segment 24 of the closed-loop core 20. The second winding 40 may be configured similar to, or substantially identical to, the first winding 30. The second winding 40 may be electrically connected in series to the first winding 30, and the electrically-conductive wire 32 used for the first winding 30 may be the same electrically-conductive wire 42 used for the second winding 40, or the wires 32, 42 may be separate and electrically coupled together.

The first winding 30 and the second winding 40 are each configured for being actuated by an electrical signal having a current ("I") that generates a magnetic field in each winding 30, 40. The magnetic field created by each winding 30, 40 generates respective magnetic fluxes m1, m2 in the closed-loop core 20, which may correspond to the electrical signal sent to each winding 30, 40. The magnetic flux m1, m2 generated by each winding flows along the closed-loop core 20 according to the direction of the current ("I") and direction of the loops or windings 34, 44 around the closed-loop core 20. For example, the first winding 30 may be configured to generate its magnetic flux m1 in a first direction, such as a counter-clockwise direction, along the closed-loop core 20 when electrical current passes through the first winding 30. The second winding 40 may be configured to generate its magnetic flux m2 in a second direction, such as a clockwise direction, along the closed-loop core 20 when electrical current passes through the second winding 40. The direction of the respective magnetic fluxes m1, m2 may be reversed by reversing the direction of the current or the direction of the windings.

By configuring the first winding 30 and the second winding 40 to generate respective magnetic fluxes m1, m2 along the closed-loop core 20 in opposing directions, the magnetic fluxes m1, m2 will intersect with each other for enabling the transmission antenna 10 to generate a polarized magnetic field B. As shown in FIG. 1, the polarized magnetic field B has magnetic field vectors oriented within the plane 21 of the closed-loop core 20 and which resembles the magnetic field of a magnetic dipole that is co-located with the transmission antenna 10. In this manner, the transmission antenna 10 generates an equivalent magnetic moment "M" inside of the closed-loop core 20, which is a vector that may be oriented in the direction of the magnetic field B vectors aligned inside the closed-loop core 20. The transmission antenna 10 may be configured to emit a near-field polarized magnetic field vector B(T) outside of the closed-loop core 20, which corresponds to the magnitude and direction of the magnetic moment M, and which also corresponds to the signal to be transmitted. The near-field polarized magnetic field B(T) emitted from the transmission antenna 10 provides a polarized electromagnetic signal T within the plane 21 of the closed-loop core 20 and oriented in the same direction, which enables the transmission antenna 10 to transmit the polarized signal T over a distance as far-field electromagnetic radiation.

The strength of the transmitted polarized signal T is partially dependent on the strength of the magnetic fields generated by the windings 30, 40 and the magnetic flux density capacity of the closed-loop core 20. The strength of the magnetic field of each winding 30, 40 may be measured by magnetic moment, and is determined by the amount of current in a loop of wire multiplied by the number of loops of wire multiplied by the magnetic permeability of the core material multiplied by the cross sectional area of the closed-loop core 20. Generally, the higher the current flowing through each winding 30, 40, the greater the strength of the magnetic field and magnetic fluxes m1, m2 generated by each winding 30, 40, and the greater the amplitude of the magnetic moment. The equivalent magnetic moment M of the transmission antenna 10 may further be expressed as:

$$M = \mu \cdot 2 \cdot N \cdot A \cdot I$$

where $\mu$ is the magnetic permeability of the core material, N is the number of turns (34, 44), A is the cross-sectional area of the closed-loop core 20, and I is the current ("I").

The first winding 30 and/or second winding 40 may be configured for increasing the electrical current flowing through each winding 30, 40 relative to certain prior antennas, such as by reducing the electrical resistance and inductive impedance of each winding 30, 40 to increase magnetic field strength. Electrical resistance is proportional to the resistivity of the wire material and the length of the wire 32, 42; and is inversely proportional to the cross-sectional area of the wire 32, 42. Inductive impedance generally increases with the number of turns 34, 44 to the second power ($N^2$). Accordingly, the windings 30, 40 may be configured with a reduced number of turns 34, 44 for reducing inductive impedance. The windings 30, 40 may also be configured with an electrically-conductive wire 32, 42 made of a low-resistivity material (such as copper), and the wire 32, 42 may also have an increased cross-sectional area and/or a reduced overall length for reducing electrical resistance.

For example, the first winding 30 and second winding 40 may each have 50 turns or fewer of the electrically-conductive wire 32, 42, more particularly 5 to 20 turns, for enabling an increase in magnetic field strength of each winding 30, 40. The respective windings 30, 40 may also reduce electrical resistance by extending along respective segments 22, 24 of the closed-loop core 20 by no more than 20% of the overall length of the closed-loop core 20. Further, the electrically-conductive wire 32, 42 may have a round cross-section with a diameter between 0.10 inches to 0.50 inches, more particularly between 0.12 inches to 0.35 inches. The wire 32, 42 may be sized between #12 AWG gauge wire to #0000 AWG gauge wire. The electrically-conductive wire 32, 42 may be made from copper or other similarly low-resistivity material, such as aluminum or superconductor material. The first winding 30 and second winding 40 configurations may be provided in various combinations for achieving different goals depending on voltage and current constraints of the system. By way of example and not limitation, the first winding 30 and second winding 40 may each have about 6 to 12 turns of #0 AWG gauge wire capable of a transmitting a current of about 30 to 60 amps, more particularly about 5 to 20 amps, with a voltage of about 30 to 40 volts for transmitting a polarized signal T at frequencies of about 2 kHz to 6 kHz.

The saturation limit of the magnetic flux density of the closed-loop core 20 may also be increased for enhancing the transmitted polarized signal T, such as by increasing the magnetic permeability and/or mass of the closed-loop core 20. For example, the closed-loop core 20 may be made from a high-magnetic-permeability material, such as ferrite-iron, ferrite-alloys, ferromagnetic ceramics, or other materials having similar ferromagnetic properties. The closed-loop core 20 may also be made from Mu-metal, which is a nickel-iron alloy composed of approximately 77% nickel, 16% iron, 5% copper and 2% chromium or molybdenum. The closed-loop core 20 may also be made from MetGlas® material, which is an amorphous iron-based alloy, typically cast as a thin ribbon.

The closed-loop core 20 may be provided in various configurations depending on the weight and size constraints of the transmission antenna 10. For example, where the size of the closed-loop core 20 is minimized, the magnetic permeability may be maximized where the number of turns 34, 44 is fixed; or the saturation limit of magnetic flux density may be maximized where the number of turns 34, 44 may be increased. In another example, the size of the closed-loop core 20 may be maximized for enhancing magnetic flux density, such that the cross-sectional area of the closed-loop core 20 may be at least 50 times greater than the cross-sectional area of the electrically-conductive wire 32, 42 of the first winding 30 and/or second winding 40.

By way of example and not limitation, the closed-loop core 20 may be made from ferrite having a cross-sectional thickness of about 15 cm (about 6 in.) by about 10 cm (about 4 in.), and may have a volume of about 0.3 cubic meters (about 1 cubic foot) for transmitting a polarized signal T at a frequency of about 5 kHz. In another example, a high-efficiency transmission antenna 10 configured for transmitting a polarized signal T at a frequency of about 10 GHz may have a cross-sectional thickness of about 1 mm (about 0.04 in.) by about 1 mm (about 0.04 in.), and have a diameter of about 1 mm (about 0.04 in.), whereby the cross-sectional thickness of the electrically-conductive wires 32, 42 may be about 1 micron to 10 microns.

Although the closed-loop core 20 may be specifically sized based on the considerations discussed above, it should also be understood that the transmission antenna 10 is capable of transmitting the polarized signal T over a broad frequency range that is nearly independent of the size of the closed-loop core 20, provided the closed-loop core 20 is made from a high-magnetic-permeability material, as described above. For example, the transmission antenna 10 made from MetGlas® material may transmit a broadband polarized signal T in a frequency range between 1 Hz and 1 MHz, such as in the ultra-low frequency (ULF) (300 Hz to 3 kHz) range and very-low frequency (VLF) (3 kHz to 30 kHz) range, and the transmission antenna 10 made from a ferrite-based material may transmit the polarized signal T in a radio frequency (RF) (3 kz to 300 GHz) range, provided the wavelength of the transmitted polarized signal T is greater than the size (e.g., diameter) of the closed-loop core 20. In this manner, the transmission antenna 10 provides an electrically-small, highly-efficient antenna, such that the transmitted polarized signal wavelength is much greater than the size of the antenna, for example about 100 times or more greater, and which may act similar to an infinitely long high-permeability ferrite rod antenna.

Another factor for enabling an increase in the strength of the transmitted polarized signal T is to reduce leakage of the magnetic fields B through the sides of the closed-loop core 20 and to promote projection of the near-field polarized magnetic field B(T) from one portion of the closed-loop core 20, such as transmission portion 26 shown in FIG. 1 and FIG. 2. For effecting such a result, the first winding 30 and second winding 40 may be arranged on the closed-loop core 20 in magnetic symmetry with each other, such that the respective magnetic fields and/or fluxes m1, m2 from each winding 30, 40 are balanced. For example, the first winding 30 and the second winding 40 may be disposed on the closed-loop core 20 in a non-overlapping manner. More particularly, the respective windings 30, 40 may be spaced from each other along the closed-loop core 20, and may be disposed on diametrically opposed sides of the closed-loop core 20. It should also be understood that reducing leakage by providing magnetic symmetry may permit arranging the windings 30, 40 over the entire length of the closed-loop core 20, as opposed to concentrating the windings 30, 40 over relatively short segments 22, 24 of the closed-loop core 20.

Although the first winding 30 and second winding 40 may be substantially similar and generate substantially similar magnetic fluxes m1, m2 in opposing directions, it should be understood that the respective windings 30, 40 may have differences in their respective configurations, and that arranging the respective windings 30, 40 in magnetic symmetry may not necessarily imply geometric symmetry. As such, the configuration of each winding 30, 40, such as wire length, size, number of turns, current or signal applied, etc. may also be adjusted for providing magnetic symmetry between windings 30, 40. It should also be understood that the windings 30, 40 may be electrically actuated in any suitable manner for producing opposing magnetic fluxes m1, m2 and generating a polarized magnetic field B in the manner described above. For example, while the first winding 30 and the second winding 40 may be electrically connected in series and actuated by a single power supply, it may also be possible to provide the same result with separate power supplies that actuate the respective windings 30, 40 independently. For example, where the windings 30, 40 have a different number of turns and are connected to different power supplies, the product of the number of turns N and current I applied to each of the windings 30, 40 may be represented as $N_1*I_1=N_2*I_2$, such that the first winding 30 and the second winding 40 may be provided with a different number of turns 34, 44 according to the ratio X:Y, and the windings 30, 40 may be connected to separate power supplies that provide currents to the respective windings 30, 40 according to the opposite ratio Y:X.

Figure 3:
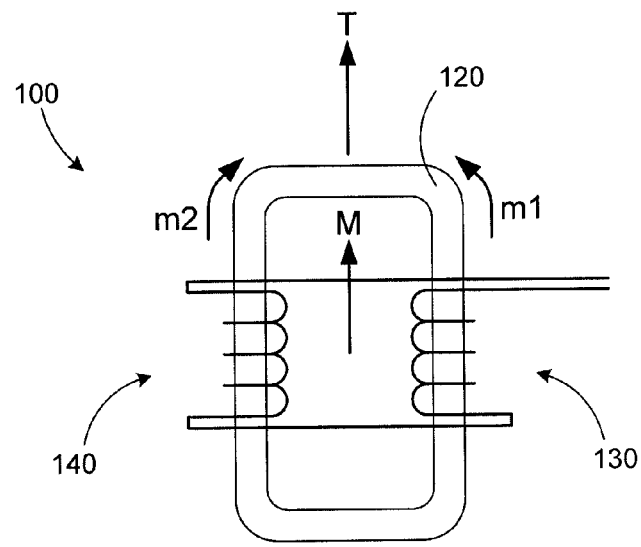
FIG. 3 is a top plan view of another transmission antenna according to the invention.

The geometric configuration of the closed-loop core 20 may also enable improved magnetic symmetry, such as by providing a symmetrical closed-loop core 20, 120, as shown in FIG. 1 and FIG. 3. For example, as shown in FIG. 1, the closed-loop core 20 may be a toroidal core 20, wherein the toroidal surface is generated by the rotation of a closed planar figure about a rotational axis lying outside the figure. For instance, if the closed planar figure (e.g., toroidal cross-section) is a circle, the surface generated is a torus, and the distance between the rotational axis and the center of the rotated circle is the torus' major radius. Toroidal surfaces, other than a torus, may also be useful as surfaces for supporting the windings 30, 40 and providing a magnetic flux path. Such toroidal surfaces may be similarly created by rotating other circular or non-circular closed figures about an axis lying outside the figure, for example, having a toroidal cross-section that is ellipsoid, rectangular, square, or polygonal. Still other configurations of the closed-loop core 20 which are not toroidal may be similarly used in embodiments of the invention.

With reference to FIG. 3, a transmission antenna 100 having a dual-C-shaped core 120 is shown. The dual-C-shaped core 120 may be in the form opposing C-shapes, or may be generally oval or elliptical. The dual-C-shaped core 120 may have the same cross-sectional configurations as the closed-loop core 20 describe above, and may have a curvature in the plane of the closed-loop core 120 that surrounds two focal points. The transmission antenna 100 may include all of the same or similar features as transmission antenna 10, and thus similar reference numerals are used to refer to similar structures. By providing such a dual-C-shaped core 120, the transmission antenna 100 may provide for improved compactness in certain orientations.

Figure 4:
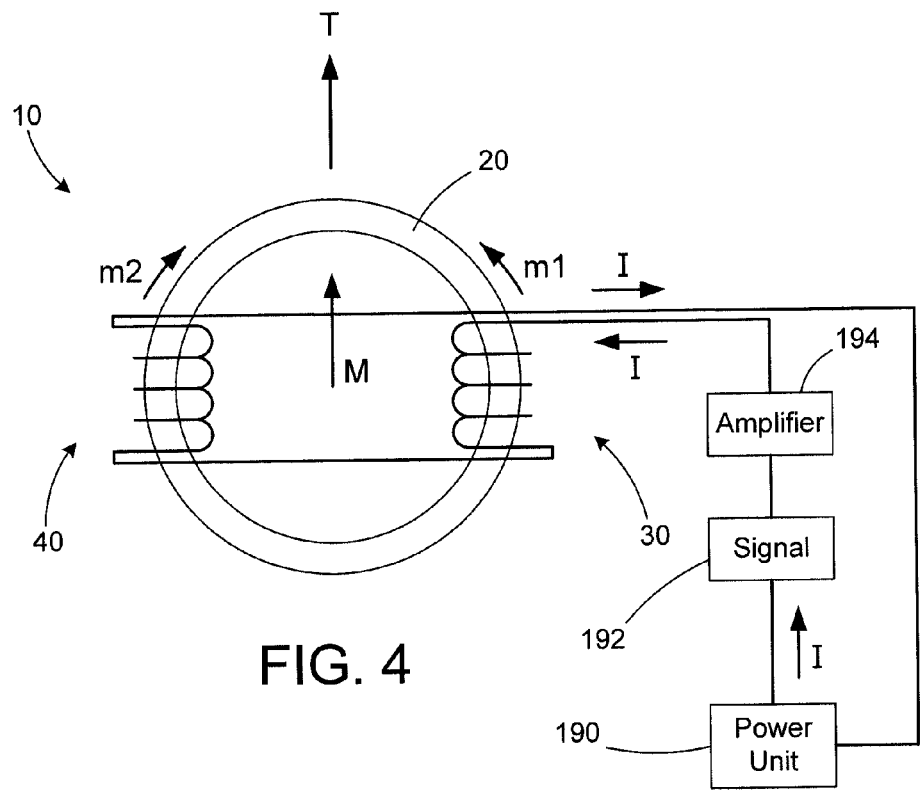
FIG. 4 is a top plan view of the transmission antenna of FIG. 1 further including a power unit, a signal conditioner and an amplifier.

Turning to FIG. 4, the transmission antenna 10 may further include a power unit 190, a signal conditioner 192, and/or an amplifier 194. The power unit 190 provides a means for supplying power or energy to the transmission antenna 10, the signal conditioner 192, and/or amplifier 194. The signal conditioner 192 is provided for converting the signal to be transmitted from its original form into an electrical signal waveform expressed as current. The electrical signal waveform (i.e., current) is then applied to the first and second windings 30, 40, which are electrically coupled to the signal conditioner 192. The electrical signal may take a variety of forms for transmitting information, such as an audio signal, video signal, data signal, or the like. The electrical signal may operate at different frequencies and may transmit the information at different rates. The amplifier 194 may be electrically interposed between the signal conditioner 192 and the windings 30, 40 for amplifying the electrical signal to be applied to the windings 30, 40. In particular, the amplifier 194 may be a current amplifier for increasing the current to the windings 30, 40, which will effect an increase in the strength of the transmitted polarized signal T in the manner described above. Such a transmission antenna 10 may be capable of transmitting the polarized signal T with a relatively flat frequency response for broadband transmission of the signal (e.g., 1 Hz to 1 MHz).

Figure 5:
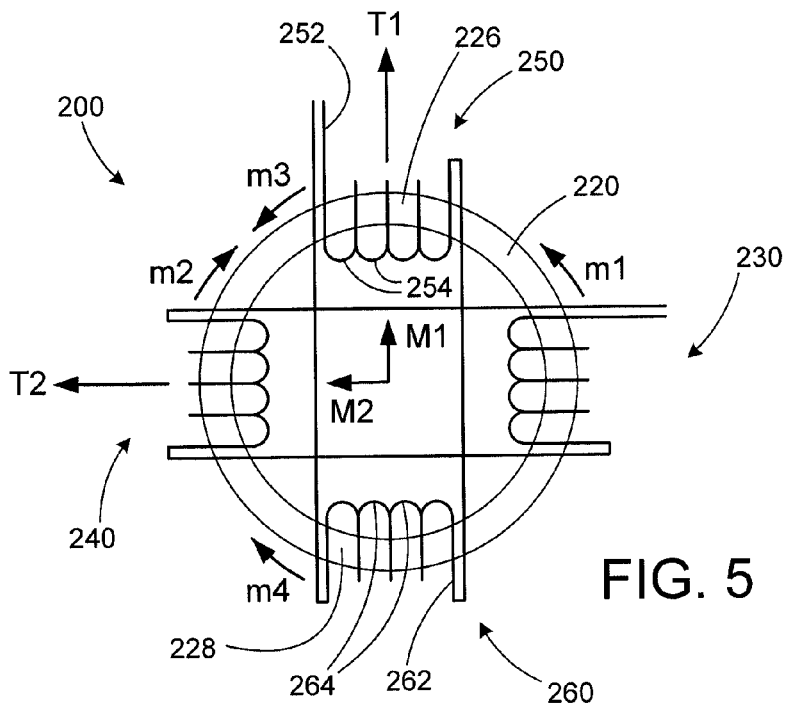
FIG. 5 is a top plan view of yet another transmission antenna according to the invention.

Turning to FIG. 5, another embodiment of a transmission antenna 200 is shown that is capable of providing multiple transmissions of polarized signals T1 and T2 simultaneously. The transmission antenna 200 includes a closed-loop core 220, a first winding 230, and second winding 240, all of which may be the same as or similar to those features described above in the transmission antenna 10 shown in FIG. 1. The transmission antenna 200 further includes a third winding 250 and a fourth winding 260, which may be similarly configured to the first winding 230 and/or second winding 240. The third winding 250 may be transversely wound with turns 254 of an electrically-conductive wire 252 around a third segment 226 of the close-loop core 220, such as 50 turns or fewer. The fourth winding 260 may be transversely wound with turns 264 of an electrically-conductive wire 262 around a third segment 228 of the close-loop core 220, such as 50 turns or fewer. The third winding 250 may be electrically connected in series to the fourth winding 260. The respective windings 230, 240, 250, 260 may be evenly spaced around the closed-loop core 220, and/or may be arranged in magnetic symmetry.

In a similar manner to the configuration of the first winding 30 and the second winding 40 (first pair) described above, the third winding 250 may generate a magnetic flux m3 in an opposite direction to the magnetic flux m4 of the fourth winding 260 when electrical current passes through the third 250 and fourth 260 windings for generating a polarized magnetic field. The third 250 and fourth 260 windings (second pair) may enable the generation of an equivalent magnetic moment M2 and polarized signal T2 in a different direction and in the same plane 21 from the equivalent magnetic moment M1 and polarized signal T1 of the first pair of windings 230, 240. Since the cross-talk between the respective winding pairs 230, 240 and 250, 260 is relatively small, the two-pair set can simultaneously transmit several magnetic fields and signals with different polarizations. The multiple transmitted polarized signals T1, T2 may be independently and continuously controlled through electrical actuation of the respective windings 230, 240, 250, 260. For example, by varying the current through the respective pairs of windings 230, 240 and 250, 260, both the amplitude and direction of both the total equivalent magnetic moment (vector sum of M1 and M2) and corresponding emitted polarized magnetic field may be varied within the polarization plane 21.

Figure 6:
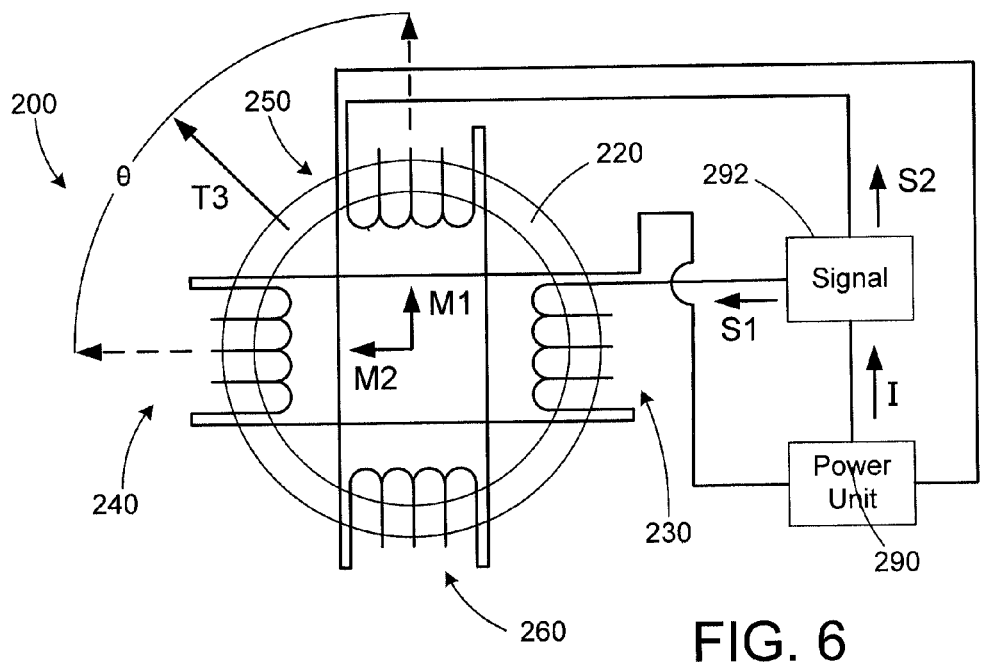
FIG. 6 is a top plan view of the transmission antenna of FIG. 5 further including a power unit and a signal conditioner according to another embodiment of the invention.

FIG. 6 depicts the transmission antenna 200 electrically coupled to a signal conditioner 292 and a power unit 290, which may be the same as or similar to the signal conditioner 192 and power unit 190 described above. The current amplifier (not shown) may also be electrically interposed between the signal conditioner 292 and the windings 230, 240, 250, 260 in a similar manner as described above. According to this embodiment, the first winding 230 and the second winding 240 are configured for receiving a first electrical signal waveform S1 from the signal conditioner 292. The third winding 250 and the fourth winding 260 are configured for receiving a second electrical signal waveform S2 from the signal conditioner 292 that is phase-shifted from the first electrical signal waveform S1. The respective pairs of windings 230, 240 and 250, 260 enable the generation of polarized magnetic fields and magnetic moments M1, M2; and by modulating amplitudes and the phase-shift between signals S1, S2, may combine to generate a variable polarized signal T3. The variable polarized signal T3 is capable of continuously changing direction along an angle (θ) within the plane 21 of the closed-loop core 220 in response to the phase-shifting between the electrical signals S1, S1.

Figure 7:
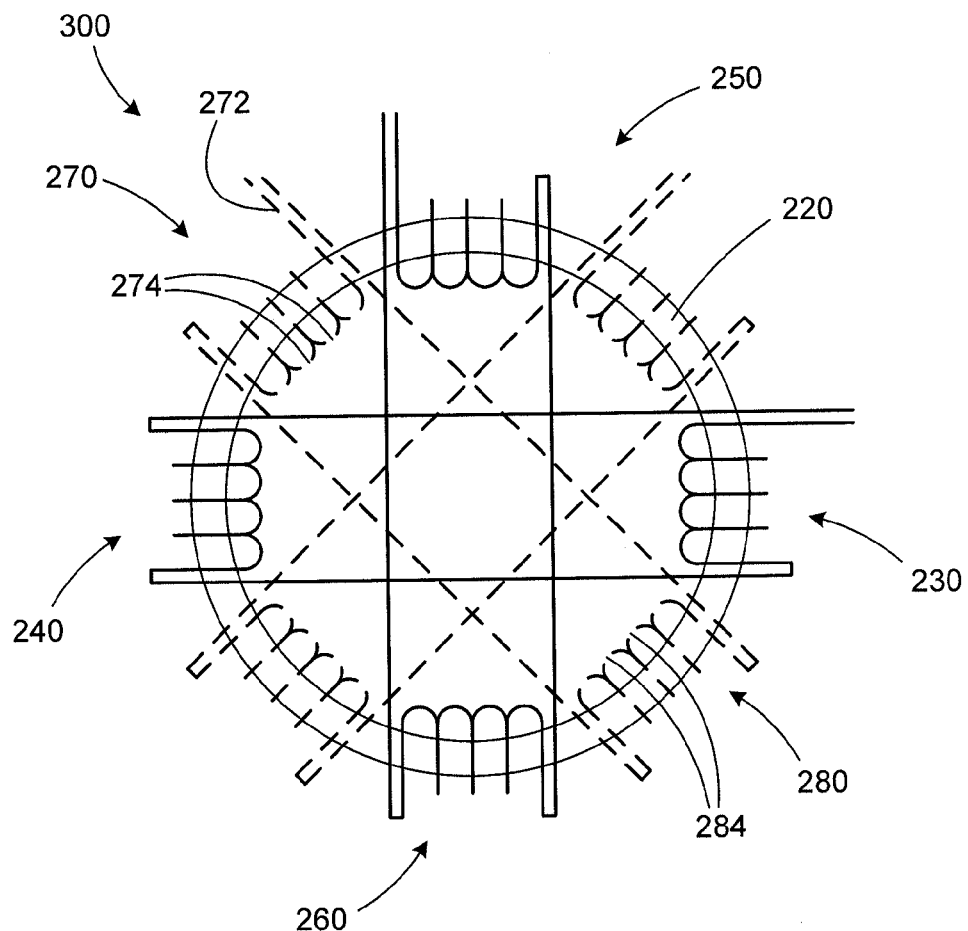
FIG. 7 is a top plan view of another transmission antenna according to the invention.

Turning to FIG. 7, a transmission antenna 300 is shown further including a first receiver winding 270 and a second receiver winding 280 respectively configured for receiving a signal. The first receiver winding 270 may be transversely wound with an electrically-conductive wire 272 around a first receiver segment of the close-loop core 220. The second receiver winding 280 may be electrically connected in series to the first receiver winding 270, and may be configured substantially similar to first receiver winding 270. The first receiver winding 270 and the second receiver winding 280 may each have a greater number of turns 274, 284 than at least one of the first winding 230 and second winding 240 used for transmission, such as 100 or more turns, more particularly 1,000 or more turns, for enabling an increase in resistance through the receiver windings 270, 280 so as to enhance the reception of transmitted electromagnetic signals.

Since the effective cross-talk between the respective windings 230, 240, 250, 260 used for transmission may be minimal, the receiver windings 270, 280 may be simultaneously employed on the same closed-loop core 220. The first 270 and second 280 receiver windings may be spaced from each other, and/or spaced with respect to other windings 230, 240, 250, 260. The first receiver winding 270 and the second receiver winding 280 may also be arranged in magnetic symmetry. The signal received by the receiver windings 270, 280 may be passed through the amplifier (not shown) and sent to the signal conditioner (not shown) for further processing.

More than one pair of receiver windings 270, 280 may be employed, and the polarization of the pairs of receiver windings may be controlled by a phase delay in a similar manner as the transmission windings 230, 240, 250, 260. In this manner, the multiple pairs of receiver windings may be used as a polarization sensitive receiver, such as a vector magnetometer for VLF/ULF. For example, the transceiver antenna 200 may actuate the transmission windings 230, 240 to transmit a narrow-beam polarized signal T1 in the VLF range for increasing ground penetration depth, for example having a penetration depth of hundreds of meters and/or a skin depth of about several dozen meters, and may further actuate the receiver windings 270, 280 in a ground penetrating radar configuration for depth (distance) measurement.

Figure 8:
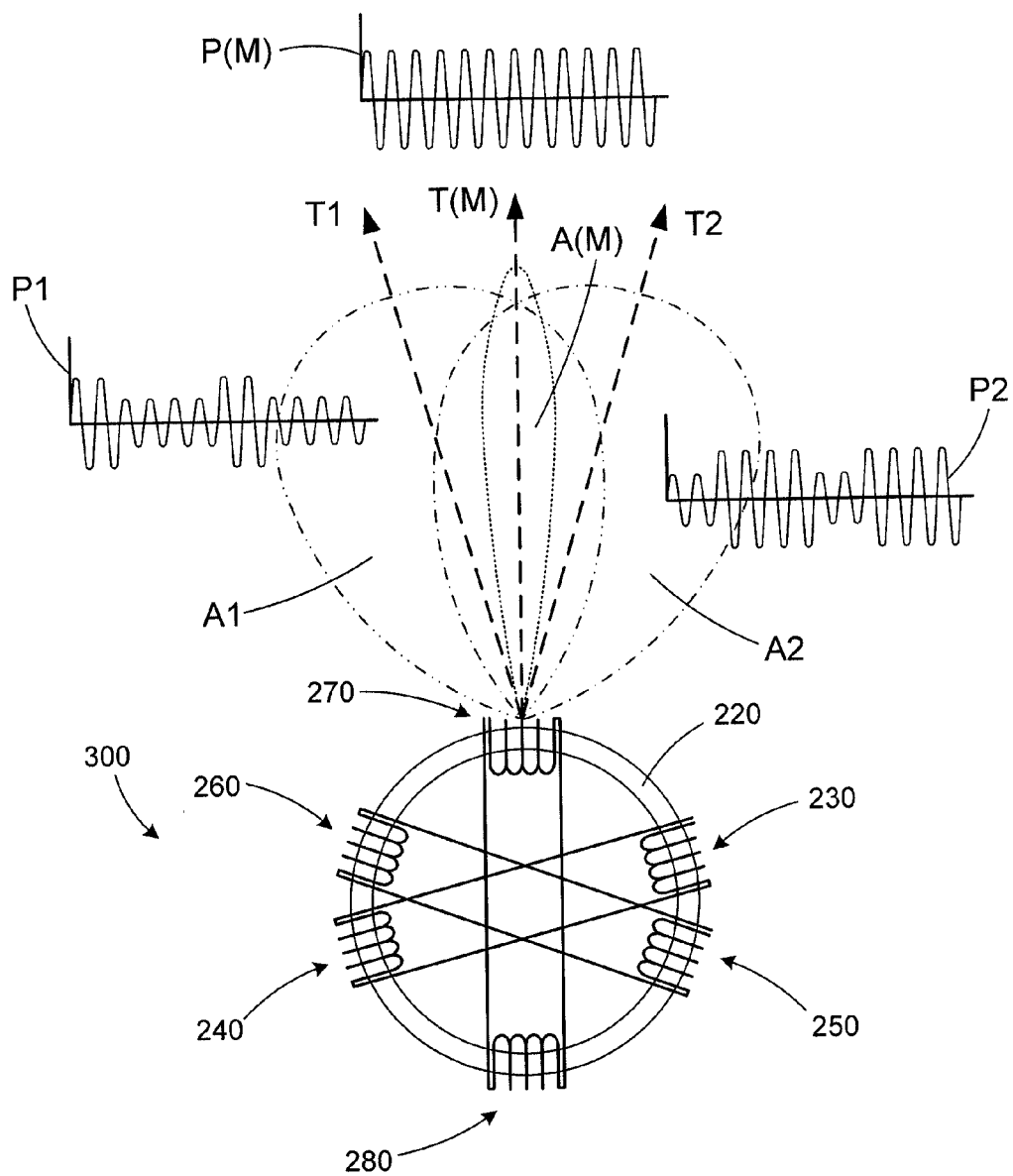
FIG. 8 is a top plan view of yet another transmission antenna according to the invention.

FIG. 8 depicts the transmission antenna 300 configured as a misaligned-beam (sub-diffraction limit beam) transceiver. As described above, the transmission antenna 300 is capable of transmitting multiple polarized magnetic signals T1 and T2. The polarization of such transmitted signals T1, T2 may be strongly polarized and provide a relatively narrow-beam of transmission, as depicted in FIG. 8 as transmission areas A1, A2. If two or more of the narrow-beams T1, T2 are misaligned then a misaligned-beam T(M) may be provided in the area in which the transmission areas A1, A2 overlap. For example, misalignment may be provided by arranging the first pair of windings 230, 240 and second pair of windings 250, 260 in geometric misalignment and transmitting a polarized transmitted signal T1, T2 with each pair. Another possible way for providing misalignment may be by "magnetic misalignment," such as arranging the first pair of windings 230, 240 and second pair of windings 250, 260 orthogonally and modulating their respective signals in such a way as to emulate two, or more, polarized transmission signals T1, T2.

By way of example, if the respective transmitted polarized signals T1, T2 each have the same carrier, but have different modulation patterns P1, P2 (e.g., dot and dash), then the misaligned-beam T(M) may be provided in an area A(M) where the amplitudes of the constituent beams T1, T2 are the same. In particular, if the modulation signal pattern P1, P2 of the transmitted beams T1, T2 is orthogonal (e.g., the dots and dashes do not overlap), then the misaligned-beam T(M) may have a different transmission pattern P(M) that is detectable. Such an orthogonal modulation may be provide if each of the transmitted beams T1, T2 carries signal S that is a function of carrier C and modulation signal M, such that:

$$S=F(C,M)$$

$$M=F^{-1}(S,C)+\text{error}$$

where F and $F^{-1}$ are modulation and demodulation functions. If modulation is linear:

$$F^{-1}(F(C,M_1)+F(C,M_2))=M_1+M_2+\text{error}$$

then, orthogonality means that:

$$\int_{t-T}^{t} M_1 \cdot M_2 \cdot dt = 0$$

where T is a modulation period. The misaligned-beam T(M) may be very sharp, having an angular resolution of 1/1,000 of diffraction limit, or sharper. The misaligned-beam T(M) may be used as a transmitter for almost any type of conventional radar, or the misaligned-beam T(M) may be used with transceiver antennas for "blind" guidance, such as blind landing or blind bombing.

Although the invention has been shown and described with respect to a certain embodiment or embodiments, it is obvious that equivalent alterations and modifications will occur to others skilled in the art upon the reading and understanding of this specification and the annexed drawings. For example, although one or two pairs of transmission windings have been described in detail above, it should be understood that more than two pairs, or more than four transmission windings, could be employed in a similar manner. Likewise, the receiver windings could be arranged on the same closed-loop core with one or more pairs of transmission windings, and more than one pair of receiver windings could be provided. In addition, although reference has been made to only one closed-loop core operating individually, it should be understood that multiple closed-loop cores could be used as part of an array for the transmission antenna. Furthermore, with particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. A transmission antenna comprising:
    an elongated closed-loop core disposed in a transmission plane, the closed-loop core having a pair of opposite long segments that extend by a length in a longitudinal direction in the transmission plane, and having a pair of opposite short segments connecting with opposite ends of the long segments, the short segments extending by a width in a direction that is transverse to the longitudinal direction in the transmission plane, the elongated closed-loop core being configured such that the lengths of the long segments are greater than the widths of the short segments;
    a first winding having an electrically-conductive wire transversely wound around one of the long segments of the closed-loop core;
    a second winding having an electrically-conductive wire transversely wound around the opposite long segment of the closed-loop core;
    a signal conditioner for sending a signal, the signal conditioner being electrically coupled to the first winding and the second winding; and
    an amplifier electrically interposed between the signal conditioner and the respective windings, the amplifier configured to amplify current of the signal from the signal conditioner to the respective windings;
    wherein, the first winding has 50 turns or fewer and is configured to generate a magnetic flux in a first direction along the closed-loop core when electrical current passes through the first winding;
    wherein, the second winding has 50 turns or fewer and is configured to generate a magnetic flux in a second direction along the closed loop core when electrical current passes through the second winding; and
    wherein the magnetic flux in the first direction is opposite the magnetic flux in the second direction for generating a polarized magnetic field and transmitting a polarized signal.

2. The transmission antenna of claim 1, wherein the first winding and the second winding are arranged on the closed-loop core in magnetic symmetry.

3. The transmission antenna of claim 2, wherein the first winding and the second winding are non-overlapping.

4. The transmission antenna of claim 2,
    wherein the first winding is electrically connected in series to the second winding;
    wherein the first winding is substantially similar to the second winding; and
    wherein the first winding is arranged diametrically opposed to the second winding on the closed-loop core.

5. The transmission antenna of claim 1, wherein the electrically-conductive wire of the respective windings is made from copper or other low-electrical-resistivity material.

6. The transmission antenna of claim 5,
    wherein the electrically-conductive wire of the respective windings has a round cross-section with a diameter greater than 0.20 inches; and wherein the number of turns of the respective windings is fewer than 20.

7. The transmission antenna of claim 1, wherein the closed-loop core has a cross-sectional area that is at least 50 times greater than the cross-sectional area of the electrically-conductive wire of the respective windings.

8. The transmission antenna of claim 1, wherein the closed-loop core is made from a ferrite-based material or other high-magnetic permeability material.

9. The transmission antenna of claim 1, further comprising:
a third winding having an electrically-conductive wire transversely wound around a third segment of the close-loop core; and
a fourth winding having an electrically-conductive wire transversely wound around a fourth segment of the close-loop core;
wherein the third winding and the fourth winding are each configured for generating a magnetic flux in a direction along the closed-loop core when electrical current passes through the respective third and fourth windings, the respective magnetic fluxes of the third winding and fourth winding being in opposite directions along the closed-loop core for generating a polarized magnetic field;
wherein the first winding and the second winding are configured for generating the polarized signal in a first direction within a plane of the closed-loop core; and
wherein the third winding and the fourth winding are configured for generating a second polarized signal in a second direction within the plane of the closed-loop core.

10. The transmission antenna of claim 1, further comprising a first receiver winding and a second receiver winding respectively configured for receiving a signal;
wherein the first receiver winding is transversely wound with an electrically-conductive wire around a first receiver segment of the close-loop core, the first receiver winding having a greater number of turns than at least one of the first and second windings used for transmission; and
wherein the second receiver winding is transversely wound with an electrically-conductive wire around a second receiver segment of the close-loop core, the second receiver winding having a greater number of turns than at least one of the first and second windings used for transmission.

11. The transmission antenna according to claim 1,
wherein the closed-loop core extends in the transmission plane by a length that is greater than a cross-sectional thickness of the closed-loop core in a direction perpendicular to the transmission plane.

12. The transmission antenna of claim 11, wherein the first winding and the second winding are arranged on the closed-loop core in magnetic symmetry.

13. The transmission antenna of claim 11, further comprising:
a third winding having an electrically-conductive wire transversely wound around a third segment of the close-loop core; and
a fourth winding having an electrically-conductive wire transversely wound around a fourth segment of the close-loop core;
wherein the third winding and the fourth winding are each configured for generating a magnetic flux in a direction along the closed-loop core when electrical current passes through the respective third and fourth windings, the respective magnetic fluxes of the third winding and fourth winding being in opposite directions along the closed-loop core for generating a polarized magnetic field;
wherein the first winding and the second winding are configured for generating the polarized signal in a first direction within a plane of the closed-loop core; and
wherein the third winding and the fourth winding are configured for generating a second polarized signal in a second direction within the plane of the closed-loop core.

14. The transmission antenna of claim 11, further comprising a first receiver winding and a second receiver winding respectively configured for receiving a signal;
wherein the first receiver winding is transversely wound with an electrically-conductive wire around a first receiver segment of the close-loop core, the first receiver winding having a greater number of turns than at least one of the first and second windings used for transmission; and
wherein the second receiver winding is transversely wound with an electrically-conductive wire around a second receiver segment of the close-loop core, the second receiver winding having a greater number of turns than at least one of the first and second windings used for transmission.

15. A transmission antenna comprising:
a closed-loop core;
a first winding having an electrically-conductive wire transversely wound around a first segment of the closed-loop core, the first winding being configured for generating a magnetic flux in a first direction along the closed-loop core when electrical current passes through the first winding; and
a second winding having an electrically-conductive wire transversely wound around a second segment of the closed-loop core, the second winding being configured for generating a magnetic flux in a second direction along the closed loop core when electrical current passes through the second winding;
wherein the magnetic flux in the first direction is opposite the magnetic flux in the second direction for generating a polarized magnetic field and transmitting a polarized signal;
wherein the first winding and the second winding are arranged on the closed-loop core in magnetic symmetry;
wherein the first winding and the second winding are non-overlapping;
wherein the first winding and the second winding are each helically wound around the closed-loop core; and
wherein the first winding and the second winding each extend along respective segments of the closed-loop core, the respective segments having a length that is less than 20% of the overall length of the closed-loop core.

16. A transmission antenna comprising:
a closed-loop core;
a first winding having an electrically-conductive wire transversely wound around a first segment of the closed-loop core;
a second winding having an electrically-conductive wire transversely wound around a second segment of the closed-loop core;
a signal conditioner for sending a signal, the signal conditioner being electrically coupled to the first winding and the second winding; and an amplifier electrically interposed between the signal conditioner and the respective windings, the amplifier configured to amplify current of the signal from the signal conditioner to the respective windings;

wherein, the first winding has 50 turns or fewer and is configured to generate a magnetic flux in a first direction along the closed-loop core when electrical current passes through the first winding;

wherein, the second winding has 50 turns or fewer and is configured to generate a magnetic flux in a second direction along the closed loop core when electrical current passes through the second winding;

wherein the magnetic flux in the first direction is opposite the magnetic flux in the second direction for generating a polarized magnetic field and transmitting a polarized signal; and wherein the closed-loop core is a toroidal core.

17. A transmission antenna comprising:

a closed-loop core;

a first winding having an electrically-conductive wire transversely wound around a first segment of the closed-loop core, the first winding being configured for generating a magnetic flux in a first direction along the closed-loop core when electrical current passes through the first winding; and a second winding having an electrically-conductive wire transversely wound around a second segment of the closed-loop core, the second winding being configured for generating a magnetic flux in a second direction along the closed loop core when electrical current passes through the second winding;

wherein the magnetic flux in the first direction is opposite the magnetic flux in the second direction for generating a polarized magnetic field;

the transmission antenna further comprising:

a signal conditioner for sending a signal, the signal conditioner being electrically coupled to the first winding and the second winding; and a third winding and a fourth winding electrically coupled to the signal conditioner;

wherein the third winding is transversely wound with an electrically-conductive wire around a third segment of the close-loop core;

wherein the fourth winding is transversely wound with an electrically-conductive wire around a fourth segment of the close-loop core;

wherein the third winding and the fourth winding are each configured for generating a magnetic flux in a direction along the closed-loop core when electrical current passes through the respective third and fourth windings, the respective magnetic fluxes of the third winding and fourth winding being in opposite directions along the closed-loop core for generating a polarized magnetic field;

wherein the first winding and the second winding are configured for receiving a first electrical signal waveform from the signal conditioner;

wherein the third winding and the fourth winding are configured for receiving a second electrical signal waveform from the signal conditioner; and wherein the respective windings are configured for generating a polarized signal that is capable of changing direction in response to the phase-shifting between the first electrical signal and the second electrical signal.

* * * * *